(12) United States Patent
FrantzDale et al.

(10) Patent No.: US 11,186,044 B2
(45) Date of Patent: *Nov. 30, 2021

(54) OPTICAL SENSING TECHNIQUES FOR CALIBRATION OF AN ADDITIVE FABRICATION DEVICE AND RELATED SYSTEMS AND METHODS

(71) Applicant: Formlabs, Inc., Somerville, MA (US)

(72) Inventors: Benjamin FrantzDale, Harvard, MA (US); Justin Keenan, Lexington, MA (US)

(73) Assignee: Formlabs, Inc., Somerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/821,486

(22) Filed: Mar. 17, 2020

(65) Prior Publication Data

US 2020/0215762 A1   Jul. 9, 2020

Related U.S. Application Data

(63) Continuation of application No. 15/865,421, filed on Jan. 9, 2018, now Pat. No. 10,611,093.

(51) Int. Cl.
*B29C 64/393* (2017.01)
*G01B 11/00* (2006.01)
(Continued)

(52) U.S. Cl.
CPC ............ *B29C 64/393* (2017.08); *B33Y 50/02* (2014.12); *G01B 11/002* (2013.01);
(Continued)

(58) Field of Classification Search
CPC ... G01B 11/002; B29C 64/393; B29C 64/153; B29C 64/135; B33Y 10/00; B33Y 50/02;
(Continued)

(56) References Cited

U.S. PATENT DOCUMENTS 8,040,530 B2    10/2011 Cooper
10,316,213 B1 *  6/2019 Arndt ................. C08G 18/7671
(Continued)

FOREIGN PATENT DOCUMENTS

NL              2018484 B2   2/2018
WO    WO 2017/108762 A1    6/2017

OTHER PUBLICATIONS

PCT/US2020/021409, Jun. 23, 2020, International Search Report and Written Opinion.
(Continued)

*Primary Examiner* — Sang H Nguyen
(74) *Attorney, Agent, or Firm* — Wolf, Greenfield & Sacks, P.C.

(57) ABSTRACT

Techniques of optically sensing fiducial targets, such as calibration patterns, within an additive fabrication device are provided. In some embodiments, fiducial targets may be disposed on a structure configured to contact source material of the additive fabrication device, the source material being a material from which the device is configured to fabricate solid objects. Indirect sensing means may be employed such that light emitted from a light source of the additive fabrication device scatters from the surface of a fiducial target. At least some of this scattered light can be measured by a sensor and used to determine a position of the fiducial target. In some embodiments, the fiducial target may be configured to move relative to the light source and/or sensor to provide additional information on the target's position via the light scattered from its surface.

16 Claims, 11 Drawing Sheets

(51) Int. Cl.
  *B33Y 50/02* (2015.01)
  *B33Y 10/00* (2015.01)
  *B29C 64/135* (2017.01)
  *B29C 64/153* (2017.01)

(52) U.S. Cl.
  CPC .......... *B29C 64/135* (2017.08); *B29C 64/153* (2017.08); *B33Y 10/00* (2014.12)

(58) Field of Classification Search
  CPC ............ G01D 5/35303; E21B 47/0002; E21B 47/101
  See application file for complete search history.

(56) References Cited

U.S. PATENT DOCUMENTS

| | | | |
|---|---|---|---|
| 10,611,093 B2 | 4/2020 | FrantzDale et al. | |
| 2002/0104973 A1 | 8/2002 | Kerekes | |
| 2006/0111807 A1 | 5/2006 | Gothait et al. | |
| 2012/0100031 A1 | 4/2012 | Ljungblad | |
| 2013/0292862 A1 | 11/2013 | Joyce | |
| 2015/0004045 A1 | 1/2015 | Ljungblad | |
| 2015/0034007 A1 | 2/2015 | Fischer et al. | |
| 2015/0064298 A1 | 3/2015 | Syao | |
| 2015/0145171 A1 | 5/2015 | Walker et al. | |
| 2016/0023403 A1 | 1/2016 | Ramos et al. | |
| 2016/0046080 A1* | 2/2016 | Thomas | B29C 64/10 264/308 |
| 2016/0054115 A1 | 2/2016 | Suis | |
| 2016/0136896 A1 | 5/2016 | Wighton | |
| 2016/0211116 A1* | 7/2016 | Lock | B23K 15/0013 |
| 2017/0036398 A1 | 2/2017 | Gumennik et al. | |
| 2017/0057174 A1* | 3/2017 | Megretski | B29C 64/259 |
| 2017/0197363 A1* | 7/2017 | Frantzdale | B29C 64/245 |
| 2017/0217103 A1 | 8/2017 | Babaei et al. | |
| 2017/0227418 A1 | 8/2017 | Snis | |
| 2017/0239752 A1 | 8/2017 | Buller et al. | |
| 2017/0355147 A1 | 12/2017 | Buller et al. | |
| 2017/0368747 A1 | 12/2017 | Nolet et al. | |
| 2019/0210289 A1 | 7/2019 | FrantzDale et al. | |
| 2020/0282657 A1 | 9/2020 | Wighton et al. | |

OTHER PUBLICATIONS

Xie et al., LIPS: A Light Intensity Based Positioning System for Indoor Environments. Mar. 7, 2014. 14 pages.
International Search Report and Written Opinion for International Application No. PCT/US2018/12927 dated Mar. 29, 2018.
International Search Report and Written Opinion for International Application No. PCT/US2020/021409, dated Jun. 23, 2020.
Extended European Search Report dated Jul. 9, 2021 in connection with European Application No. 18900224.9.
International Preliminary Report on Patentability for International Application No. PCT/US2018/12927 dated Jul. 23, 2020.

* cited by examiner

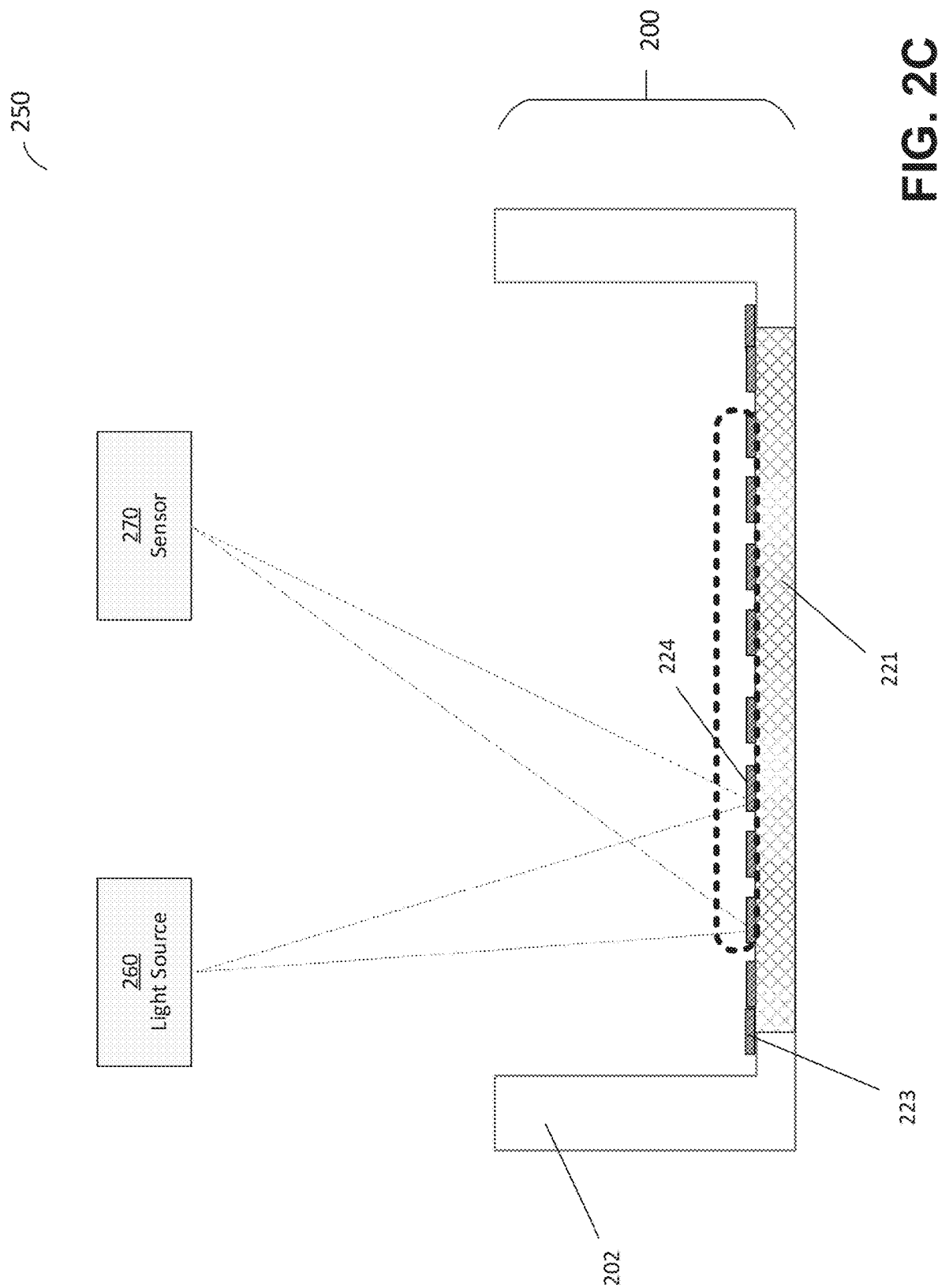

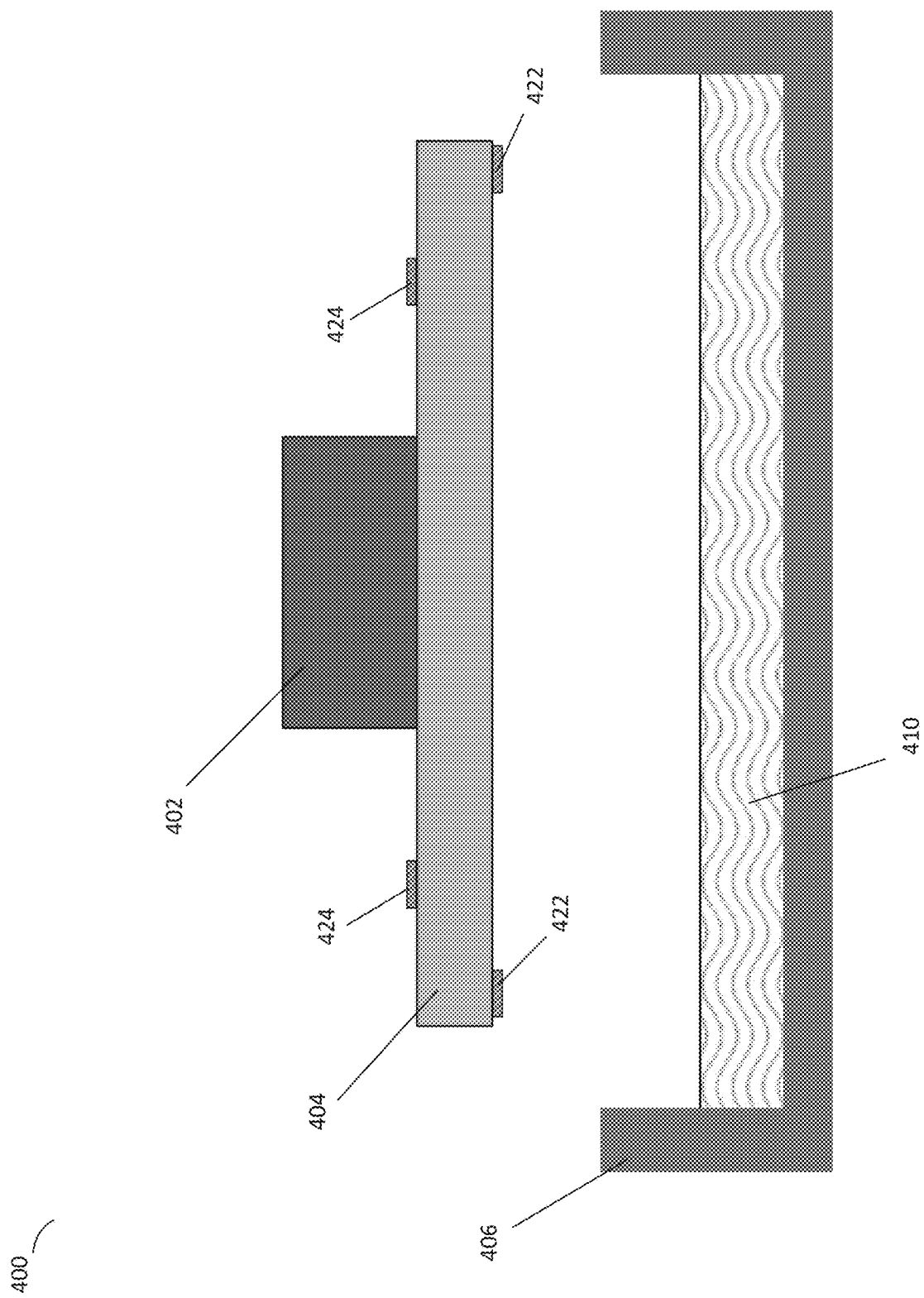

OPTICAL SENSING TECHNIQUES FOR CALIBRATION OF AN ADDITIVE FABRICATION DEVICE AND RELATED SYSTEMS AND METHODS

CROSS REFERENCE TO RELATED APPLICATIONS

The present application claims the benefit as a continuation under 35 U.S.C. § 120 of U.S. application Ser. No. 15/865,421, filed Jan. 9, 2018, which is hereby incorporated by reference in its entirety.

FIELD OF INVENTION

The present invention relates generally to systems and methods for calibrating an additive fabrication device via optical sensing.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a build surface upon which the object is built.

In one approach to additive fabrication, known as stereolithography, solid objects are created by successively forming thin layers of a curable polymer resin, typically first onto a build surface and then one on top of another. Exposure to actinic radiation cures a thin layer of liquid resin, which causes it to harden and adhere to previously cured layers or the bottom surface of the build surface.

SUMMARY

According to some aspects, an additive fabrication device configured to fabricate an object by forming layers of solid material on a build platform is provided, the solid material being formed from one or more source materials, the additive fabrication device comprising at least one light source, at least one sensor, a dispenser configured to dispense the one or more source materials into a build region of the additive fabrication device, a first structure configured to contact the one or more source materials within the build region during said fabrication of the object, wherein a surface of the first structure includes at least a first calibration pattern, and at least one processor configured to direct the at least one light source to the first calibration pattern, measure, via the at least one sensor, an intensity of light scattered from the first calibration pattern, and determine a position of the first structure based at least in part on the measured intensity of light.

According to some aspects, a method of calibrating an additive fabrication device configured to fabricate an object by forming layers of solid material on a build platform is provided, the solid material being formed from one or more source materials, the method comprising directing at least one light source of the additive fabrication device onto a first calibration pattern, wherein the additive fabrication device comprises a first structure configured to contact the one or more source materials within the build region during said fabrication of the object, and wherein the first calibration pattern is disposed on a surface of the first structure, measuring, via at least one sensor of the additive fabrication device, an intensity of light scattered from the first calibration pattern and originating from the at least one light source, and determining a position of the first structure based at least in part on the measured intensity of light.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIG. 2C illustrates illumination of fiducial targets of the container depicted in FIGS. 2A-2B and reception of light scattered from the fiducial targets, according to some embodiments;

FIG. 4 illustrates a build platform in a stereolithographic printer having a plurality of fiducial targets disposed on its surface, according to some embodiments;

DETAILED DESCRIPTION

Systems and methods for calibrating an additive fabrication device via optical sensing are provided. As discussed above, in additive fabrication a plurality of layers of material may be formed on a build platform. An additive fabrication device generally needs to be calibrated correctly to ensure that material is formed in the desired locations. For instance, an additive fabrication device that forms solid material by directing a laser beam (or other light source) onto source material is calibrated so that when the laser beam is directed in a particular manner, the light is incident upon a known location and, in some cases, at a known distance from the laser beam source. Such calibration may take the form of data stored or otherwise accessible to the additive fabrication device that can be referenced so that the system properly controls the laser beam to produce a desired result. If the calibration values are incorrect, the system will control the laser beam in a way that produces a result different from that which was intended.

Figure 1A:
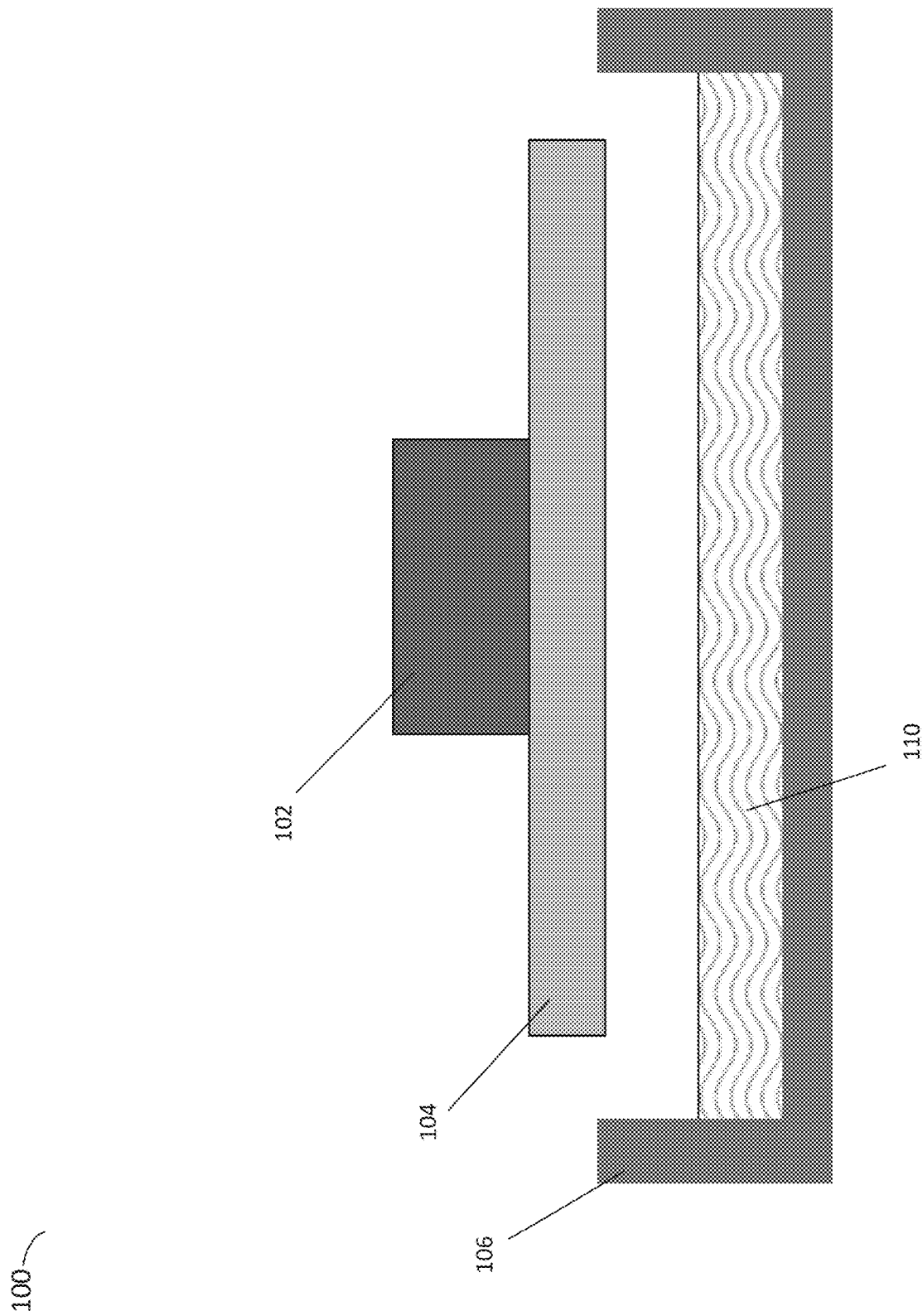
FIGS. 1A-1C illustrate a schematic view of a stereolithographic printer that forms a plurality of layers of a part, according to some embodiments.
Figure 1B:
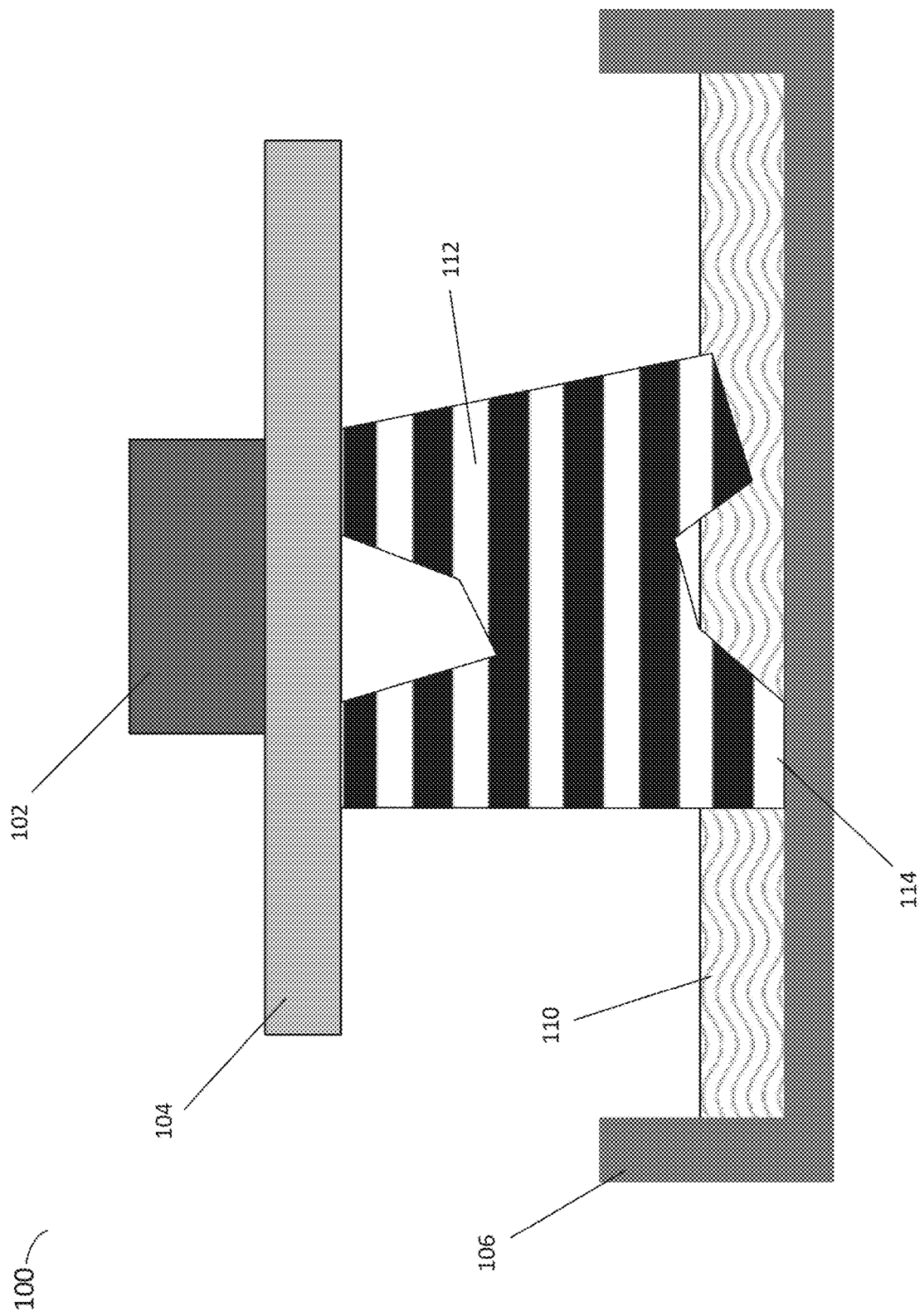
Figure 1C:
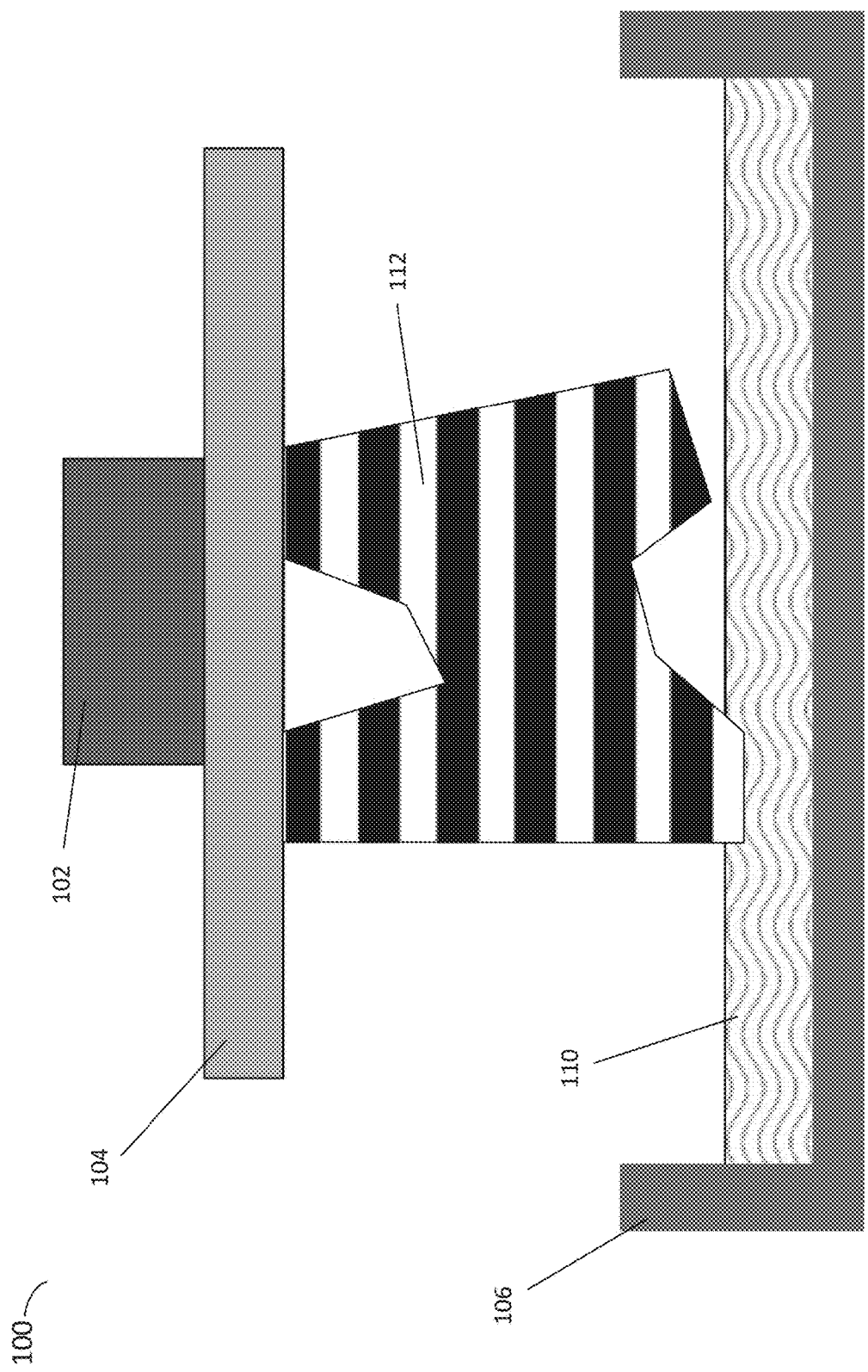

To illustrate one exemplary additive fabrication technique in which a part is formed on a build platform, an inverse stereolithographic printer is depicted in FIGS. 1A-C. Exemplary stereolithographic printer 100 forms a part in a downward facing direction on a build platform such that layers of the part are formed in contact with a surface of a container in addition to a previously cured layer or the build platform. In the example of FIGS. 1A-C, stereolithographic printer 100 comprises build platform 104, container 106, axis 108 and liquid resin 110. A downward facing build platform 104 opposes the floor of container 106, which is filled with a liquid photopolymer 110. FIG. 1A represents a configuration of stereolithographic printer 100 prior to formation of any layers of a part on build platform 104.

As shown in FIG. 1B, a part 112 may be formed layer-wise, with the initial layer attached to the build platform 104. The container's floor may be transparent to actinic radiation, which can be targeted at portions of the thin layer of liquid photocurable resin resting on the floor of the container. Exposure to actinic radiation cures a thin layer of the liquid resin, which causes it to harden. The layer 114 is at least partially in contact with both a previously formed layer and the surface of the container 106 when it is formed. The top side of the cured resin layer typically bonds to either the bottom surface of the build platform 4 or with the previously cured resin layer in addition to the transparent floor of the container. In order to form additional layers of the part subsequent to the formation of layer 114, any bonding that occurs between the transparent floor of the container and the layer must be broken. For example, one or more portions of the surface (or the entire surface) of layer 114 may adhere to the container such that the adhesion must be removed prior to formation of a subsequent layer.

Techniques for reducing the strength of the bond between a part and a surface may include inhibiting the curing process or providing a highly smooth surface on the inside of a container. In many use cases, however, at least some force must be applied to remove a cured resin layer from the container. FIG. 1C illustrates the stereolithographic printer subsequent to the separation of the part 112 from the container 106 by application of force. The process shown in FIGS. 1A-1C may then repeat to form additional layers of the part until the desired part is produced.

As discussed above, one common difficulty addressed by calibration stems from the need to determine various parameters needed to correctly form layers of solid material at any desired points within a spatial region of the device, referred to herein as the build region. Such parameters may take various forms, such as mappings of coordinates to various electrical properties, adjustments to paths and trajectories, and/or physical offsets between expected and actual exposure points. In some cases, these parameters are fundamental to the operation of a system, such as a determination of voltages needed to cause a galvanometer-driven mirror to deflect the path of a laser beam the angle required to intersect the build region at a given point. In some cases, parameters may be viewed as corrections to account for various physical imperfections or inaccuracies, such as might be caused by a misaligned exposure source.

Various calibration steps may be taken as part of a manufacturing or dedicated calibration procedure in order to determine appropriate calibration parameters. In some systems, a grid of optical sensors, sometimes known as fiducial sensors or fiducials, are temporarily installed into the build region of an additive fabrication device at known locations. An exposure system, potentially starting from a base or estimated set of parameters, may then be used to expose a point within the build region expected to correspond to a fiducial sensor. By detecting direct exposure from the exposure source, the fiducial sensor may confirm whether a given set of parameters results in the expected exposure point within the build platform. Alternatively, the absence of a detection may be used to provide feedback to a calibration process adjusting various parameters until the appropriate point within the build region is exposed. In some instances, this may advantageously involve the use of multiple fiducial sensors at different known locations within the build region and repeated iterations of calibration and testing. Various approaches to such calibration may be applied, including forms of linear and nonlinear function fitting, lookup tables, and other algorithmic or heuristic techniques.

Installation of fiducial sensors into an additive fabrication device has several drawbacks, however. First, the sensors require space within the additive fabrication device that may cause the device to increase in size. In cases where a compact additive fabrication device is desirable, therefore, the use of fiducial sensors may tend to inhibit the production of a desired device. Secondly, fiducial sensors can increase the cost and complexity of the additive fabrication device. Some additive fabrication devices include components intended to be used and replaced periodically. These devices in particular may suffer from increased cost where the disposable components include fiducial sensors, because the sensors must be re-installed and/or re-purchased each time the component is replaced.

The inventors have recognized and appreciated that an additive fabrication device may be calibrated via calibration patterns disposed onto suitable components of the device that are scanned by a suitable light source. By measuring the manner in which light scatters from one or more calibration patterns, a position of the calibration pattern may be determined. In particular, components of an additive fabrication device that, at some point in fabrication, come into contact with a source material from which the device forms parts may be especially suitable for the application of calibration patterns, since such components typically have a known and well-defined spatial relationship with the build region of the device.

While calibration patterns could be applied to a component used only for calibration, such a component would be inserted into the additive fabrication device during calibration and then subsequently removed. This approach both increases the time to calibrate the additive fabrication device in addition to making it impossible to calibrate the device in any manner during fabrication. Moreover, to accurately determine the position of a component used only for calibration, the size and position of the component needs to be carefully controlled in order to accurately map the determined position of the component to other components of the additive fabrication device that play a role in fabrication.

Embodiments of the present invention allow for determining the position of a component of an additive fabrication device without requiring the use of fiducial sensors or other active means associated with that position. One or more regions, referred to herein as fiducial targets, may be provided at known locations within the additive fabrication device. A fiducial target may include any target that is recognizable via light scattered from its surface, such as a calibration pattern.

According to some embodiments, fiducial targets may be incorporated into various components of an additive fabrication device, including removable components. The fiducial targets may, in some embodiments, diffusely emit or reflect energy received from a light source when the light source is incident on the pattern. One or more sensors may then be configured to detect and measure energy emitted or reflected from one or more fiducial targets. Such measurements may be utilized in various ways, and in some cases analyzed much as if the passive fiducial target were in fact an instrumented fiducial sensor. In some cases, whether a fiducial target has been exposed and/or to a position of the target may be determined based on the measurements.

In some embodiments, a fiducial target may be a calibration pattern with contrasting emission and/or reflection properties, such as a printed "bar code" or a similar distinctive pattern. A light source may be operated so that its emitted light travels over at least a portion of the fiducial target (e.g., by altering a direction in which the light source points, by moving the light source, by moving the fiducial target, or by some combination thereof). Movement of the illuminated areas between regions of the target with differing properties may then, in turn, create a distinctive pattern in the measurements taken by sensors measuring light scattering from the illuminated areas. These patterns may then be correlated, providing both additional spatial resolution for the location of the exposure point at a given time and increasing the reliability of the measurement, by allowing for detection of rising or falling signals, rather than against absolute values or thresholds.

Following below are more detailed descriptions of various concepts related to, and embodiments of, techniques for calibrating an additive fabrication device via optical sensing. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

While the optical sensing techniques described herein may be applicable to a wide range of additive fabrication technologies, and to various components within additive fabrication devices employing such technologies, for purposes of illustration herein specific examples of components and additive fabrication devices are discussed. These examples should not be seen as limiting, and are merely provided to illustrate the techniques described herein.

Figure 2A:
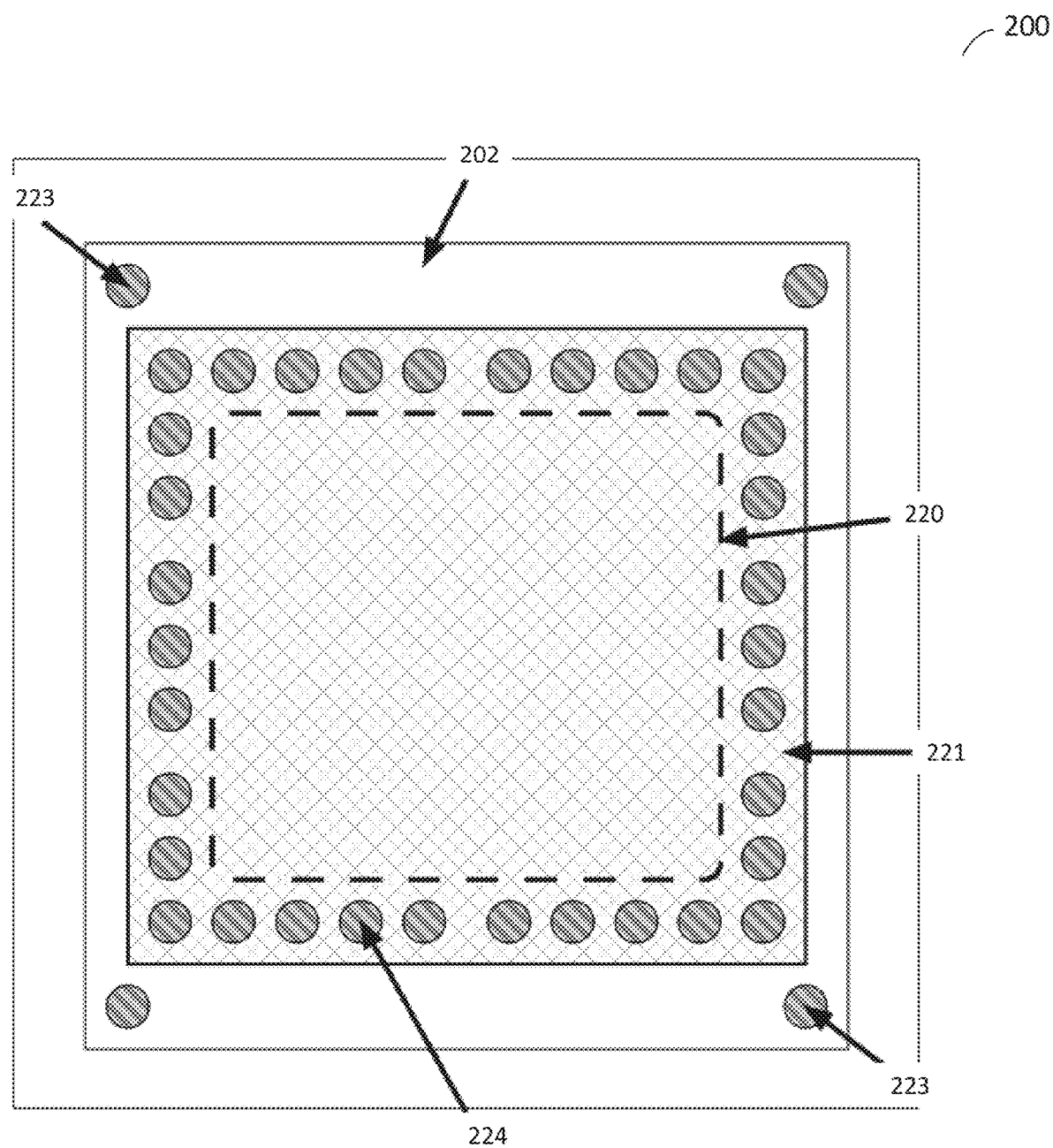
FIGS. 2A-2B illustrate top and side views, respectively, of a container having a plurality of fiducial targets disposed on its surface, according to some embodiments.
Figure 2B:
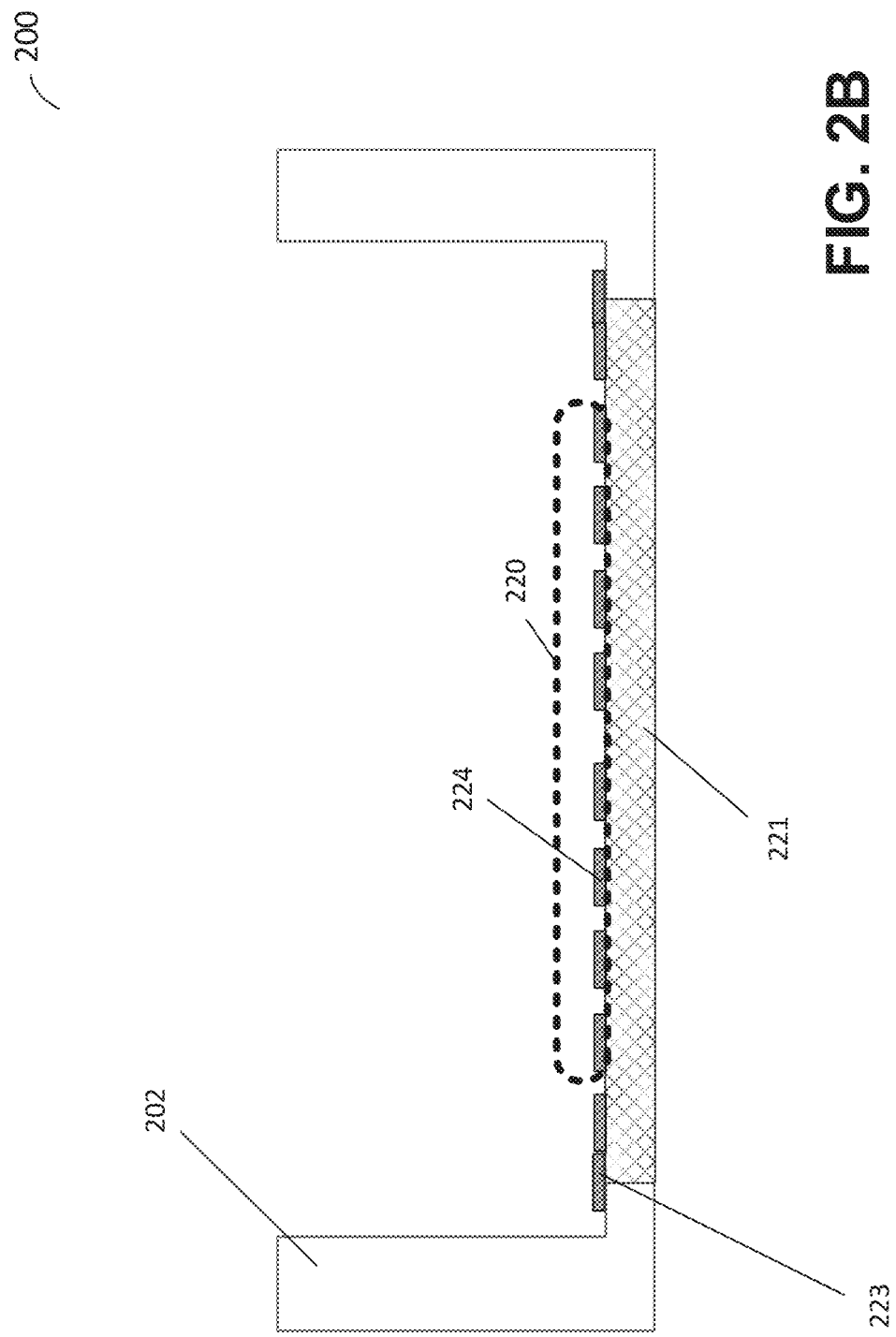

FIGS. 2A-2B illustrate top and side views, respectively, of a container having a plurality of fiducial targets disposed on its surface, according to some embodiments. In the example of FIGS. 2A-2B, a container 200 suitable for use in a stereolithographic printer is shown. Container 200 may be deployed, for example, as container 106 shown in FIGS. 1A-1C or in some other stereolithographic additive fabrication device.

In the example of FIGS. 2A-2B, the container 200 includes a solid structure 202 on which a number of fiducial targets (including targets 223 and 224), shown in the figure as shaded circles, are disposed. At least region 221 of the solid structure is transparent; the remainder of structure 202 may, or may not be transparent, or may be transparent in a different manner to region 221 (e.g., transparent to different wavelengths of light). The region 220 is the build region for an additive fabrication device in which container 200 may be disposed—that is, the region 220 is the region in which solid material may be formed by the additive fabrication device. As discussed above, one technique by which solid material may be formed within a container such as container 200 is to direct actinic radiation through a transparent portion of the container, thereby photocuring a liquid photopolymer held within the container.

The particular positions of the fiducial targets shown in the example of FIGS. 2A-B are provided merely as an example. In general, the fiducial targets may be positioned at any desired points on or within the container 200, including on the underside of the container (the latter configuration is not shown in FIGS. 2A-2B). In the example of FIGS. 2A-2B, fiducial targets 223 are included at corners of the container 200. While fiducial targets 223 are depicted in the example of FIGS. 2A-2B as being disposed in the interior of the container, they could alternatively be positioned on the opposite side of the base of the container.

According to some embodiments, fiducial targets may be adhesive stickers or other conventionally printed material affixed to, or printed directly on, a known location of the container 200. The known locations of the fiducial target may be stored in a computer readable medium of the additive fabrication device and/or may be encoded within a pattern of a fiducial target, as described further below (e.g., a fiducial target coupled to a removable component), or otherwise accessible to a processor of the additive fabrication device. Various dimensions, including the size of a fiducial target and/or the size and shape of features of the fiducial target, may also be stored in such ways and accessed to detect the fiducial target, as discussed further below.

According to some embodiments, container 200 may be configured to be removably inserted into a stereolithographic additive fabrication device and configured to contain build material within the device to be exposed to actinic radiation. In some embodiments, the container may be contained within an enclosure that substantially reduces the transmission of actinic radiation into the enclosure. In such instances, the principal source of actinic radiation within the system may originate within the enclosure.

For example, material within the build region 220 may be exposed by a laser emitting actinic radiation. This actinic radiation may be directed onto various points within the build region 220 by the use of galvanometer-driven mirrors, which rotate to deflect the path of a beam of radiation. In some instances, such actinic radiation may be transmitted through the actinically transparent region 221 before interacting with a curable material within the build region 220. Such a transparent region 221 may be the same size as the build region 220 or, as shown in the example of FIGS. 2A-2B, the build region 220 may lie within the transparent region 221 such that a peripheral area 222 exists where actinic radiation may be transmitted through an actinically transparent region 221, but where no formation of material is expected to occur.

FIG. 2C illustrates illumination of fiducial targets of the container depicted in FIGS. 2A-2B and reception of light scattered from the fiducial targets, according to some embodiments. The example of FIG. 2C depicts one illustrative manner in which light may be produced by a light source 260, scattered from one or more fiducial targets, and the scattered light detected by a sensor 270. It will be appreciated that the light source and sensor may be positioned in any suitable locations with respect to the container 200, and that the light source and sensor shown in FIG. 2C are provided merely to illustrate the scattering of light from fiducial targets without wishing to be bound to any particular position of these elements. In particular, the light source 260 may be located below the container 200 (the light source 260 in FIG. 2C is shown located above the container).

According to some embodiments, the sensor and light source need not be positioned on the same side of the container with respect to one another, nor is system 250 limited to only a single light source and single sensor, but in general may include any number of such components. In particular, multiple sensors may increase the sensitivity of the system to detect light scattered from a fiducial target and/or may increase a coverage area in which such light may be detected.

In some embodiments, the light source 260 may also be a source of actinic radiation utilized to photocure a liquid photopolymer held in container 200. In some embodiments, an additive fabrication device may include a single source of light (e.g., a laser beam) and that source of light may be directed to both scatter light from one or more fiducial targets, thereby calibrating the position of container 200, or may instead be directed to photocure liquid photopolymer in the container. The light source 260 may produce light of any wavelength, or combination of wavelengths, which may include visible as well as non-visible wavelengths (e.g., infrared, x-ray, ultraviolet, etc.).

In some embodiments, an additive fabrication device may include multiple light sources each configured to illuminate one or more fiducial targets within the device. In some cases, one of these light sources may also be controlled to form solid material (e.g., by photocuring a photopolymer, by consolidating powdered material, etc.). Multiple light sources may enable calibration based upon differences between the primary and alternative exposure source positioning or other properties.

According to some embodiments, multiple light sources within an additive fabrication device may share components for directing light from the source to a target, such as lenses and/or mirrors. In some cases, the light sources may use the same deflection or other guiding means (e.g., lenses and/or mirrors), allowing calibration information obtained through illumination of a fiducial target with one light source to directly indicate how the other light source would be expected to illuminate the same location. For example, an embodiment utilizing a comparatively high-power infrared laser to expose a source material in an additive fabrication device may additionally include a comparatively low-power visible light laser diode. The beam produced by the low-power laser may be directed utilizing the same deflection or other guiding means used for the higher power laser (e.g., galvanometer-controller mirrors). In this way, fiducial targets may be illuminated using the lower power laser, as described above, and calibration parameters may be determined applicable to the direction of both high and lower power radiation sources.

It will be noted that, contrary to the illustrative example of FIG. 2C, some additive fabrication devices, such as fused deposition modeling devices, do not use a light source for fabrication. Nonetheless, it will be appreciated that a light source may be included in such devices specifically for the purposes of calibration. For instance, fiducial targets may be read using a calibration light source, such as a low-power laser, in order to determine the position of fiducial targets located on structures such as build platforms for fused filament fabrication systems or powder beds in binder-jetting powder systems. Such fiducial targets may then be used in a "reverse" direction, whereby an already-calibrated optical system may be operated to determine an unknown position for a fiducial target when performing additional calibration of the optical system. In such cases, a known position of a fiducial target may then be used in order to confirm the presence and position of a movable or removable component, rather than for calibration of an optical system.

In some embodiments, fiducial targets may be used to measure translation and/or rotation of a target surface, such as a build platform or other component. In such embodiments, the target surface may comprise one or more, and preferably at least three, fiducial targets on the surface, facing the exposure source of calibration exposure. As those having skill in the art will appreciate, the location in space of fiducial points may then be used to extrapolate the position of the target surface, including information regarding offsets and rotations. Techniques measuring the position and rotation of surfaces may be particularly useful in determining if two planes are parallel and, if not, introducing various compensations for the differences from parallel.

According to some embodiments, sensor 270 may include one or more photodiodes and/or other photodetectors. Such sensors may, in some cases, be mounted behind wide angled diffusers, such as semi-opaque plastic domes and/or fitted with one or more optical filters. In some embodiments, a filter fitted to sensor 270 may include a notch filters, a polarized filter, and/or other means of excluding light sources and/or frequencies.

In some embodiments, the light source 260 may be located beneath the container 200 and may direct light through the transparent portion 221 of the container such that the light may reach the fiducial targets 224 after passing through the transparent region 221. Scanning of fiducial targets 224 in this manner may provide a number of advantages. As one example, locating fiducial targets 224 substantially within the same plane as the build region 220 may improve calibrations performed using such targets 224 by accurately measuring any path length dependent shifts or errors to the fiducial targets, and thereby to the build region based on their relative spatial relationship. Moreover, certain types of materials comprising the transparent region 221 may influence the transmission of actinic radiation such that exposure is deflected or otherwise shifted. Placement of fiducial targets on the upper side of the transparent region 221 when the light source is located on the lower side of the container thus allows for such influences to potentially be measured and taken into consideration during a calibration process. As a result, the accuracy of fabrication, and thereby the quality of fabricated parts, may be improved by directing light during fabrication according to the measured behavior of light through the container during calibration. This approach may be particularly beneficial, for example, where an optical window of a container has a thickness that varies across the window and/or where there are materials having different refractive indices within the window.

In some embodiments, the light source 260 may be located above the container 200 and may direct light onto fiducial targets 223 located on the upper side of the container.

In some embodiments, it may be advantageous for non-directional sensors to be oriented to face the fiducial targets and positioned in an area where scattered radiation from one or more fiducial targets is expected, such as below the mounted location of container 102 proximate to the exposure source. Such non-directional sensors may then be configured in order to measure the amount of actinic radiation impinging upon them, such as from a diffuse reflection source. Such non-directional sensors do not need to be placed within any particular optical path, so long as they are capable of detecting light diffusely reflected, or scattered, from the fiducial targets.

According to some embodiments, the light source, sensor and/or fiducial target(s) may be moved to produce a scan of the fiducial target by adjusting the area of light exposed by the light source with respect to the fiducial target, and/or by adjusting the path that light takes from the light source to the sensor. For instance, in the example of FIG. 2C, the container 200 may be moved and/or the light source controlled to redirect the light in a different direction. In either case, the area of the container that the light source exposes will change, thereby potentially causing a change in light scattering behavior from one or more fiducial targets. This change may be measured by the sensor to determine information about the position of these targets.

According to some embodiments, a calibration cycle may include one or more, though preferably a number of, exposures of fiducial targets 223 and/224 by light source 260 and corresponding detections of scattered light by sensor 270. The cycle may, in some cases, also include motion of the fiducial targets, light source and/or sensor as described above, in between or during exposures of the fiducial targets by the light source. In some embodiments, a calibration cycle may be initiated by an additive fabrication device in response to a trigger event, such as insertion of a component of the additive fabrication device (e.g., insertion of container 200), as a step prior to fabrication of a part, and/or at intermediate stages during fabrication of a part.

According to some embodiments, at least one processor coupled to the light source 260 and sensor 270 (not shown in FIG. 2C) may be configured to operate the light source (e.g., turn the source on or off, adjust a direction of exposure, amount of exposure, and/or focal length) and to perform analysis of measurements produced by the sensor. In some embodiments, the at least one processor may also be configured to move one or more components of the additive fabrication device on which one or more fiducial targets are disposed (e.g., container 200). The at least one processor may be configured to perform any of a number of fixed calibration cycles in which the light source and sensor are operated in a sequence to produce calibration data from fiducial targets within the additive fabrication device. Optionally, such a sequence may include causing motion of one or more components of the additive fabrication device (e.g., container 200). In some embodiments, the at least one processor may be configured with logic that determines operations of the light source 260 and/or sensor 270 to perform for further calibration in response to analysis of light received by the sensor 270.

It may be appreciated that, although it may be convenient to describe a region that is exposed by a light source as a point, the actual region exposed necessarily covers a certain area based upon the characteristics of the exposure system. As such, references to an exposure point are considered to have the same meaning as an exposure area. Laser-based systems, for example, may generate beams which have various emission modes, energy densities, and distortions which impact the actual shape of an exposure point. This shape may be measured via a fiducial target by shifting the exposure point such that an edge between contrasting regions of the fiducial target is expected to fall within the area of the exposure point. The actual exposure of the edge of the fiducial target will thus depend upon the actual shape of the exposure point. The degree to which the edge is exposed may be measured via indirect sensing of changes in scattered or reflected energy, such as described above. Based upon the motion of the exposure point and measured exposure of the fiducial target edge, the actual area of the exposure point may be determined.

In addition, other characteristics of an exposure spot may also be measured. As one example, it may be desirable to determine the width of the exposure point containing a given percentage of the total energy of the exposure point, particularly in system wherein the exposure energy is expected to decrease, in part, based upon the distance from the center of the exposure point. In an embodiment implementing this aspect of the invention, a fiducial target may be formed with a series of regions with increasing widths in an axis, such as lines of 50 um through 200 um, alternating with similar sized regions of contrasting optical properties (e.g., stripes). An exposure spot may then be moved across said alternating region in the direction of the axis and signals recorded at the non-directional sensor. Such recorded signals may then form a "sin" shaped wave, oscillating in amplitude based upon the motion of the exposure point across the alternating regions. Accordingly, the number of peaks and/or troughs of the signal may be used to determine the location of the exposure point within the sequence of alternating regions of known widths. This oscillation may then be used to determine the approximate full-width half-max of the exposure point.

In particular, the inventors have appreciated that, when scanning an exposure point across regions of alternating optical properties within a fiducial target, a measured amplitude of the indirect exposure signal may be at a maximum when the exposure point traverses a portion of the alternating region with stripes having widths approximately equal to the width of the exposure point. As an illustrative example, a circular exposure point having a radius of 250 μm may be partially scattered or reflected while passing over a fiducial target comprising alternating stripes having comparatively higher and lower scattering properties with 50 μm stripe widths. The amplitude of the oscillations measured in a signal scattering from the fiducial target may be comparatively low. In contrast, when passing over alternating stripes having 250 μm stripe width, the full width of the exposure point may be incident upon a region of comparatively higher or lower scattering, thus causing comparatively high amplitude oscillations in the indirect sensing signal compared with the amplitudes measured for 50 μm stripe widths. By correlating the location of the exposure point within the sequence of alternating regions, the known widths of the regions, and the amplitude of oscillations within a given region, an approximate measurement of the full-width half-max dimension of the exposure point may be determined.

According to some embodiments, an additive fabrication device may be configured to detect discontinuities in surface properties (e.g., diffusivity, reflectivity, etc.) of a fiducial target. The device may operate light source 260 and/or sensor 270 via the techniques described above such that the exposure path of the light source crosses a discontinuity in the surface properties of the fiducial target. A position of the discontinuity may be compared by at least one processor of the additive fabrication device to an expected position to determine whether there is a difference, and if so, to perform adjustments of the device to recalibrate. This process may be repeated until any difference between the expected and measured position falls below a desired threshold.

Figure 3B:
FIGS. 3A-3B depict illustrative calibration patterns suitable for application within a fiducial target, according to some embodiments.
Figure 3A:
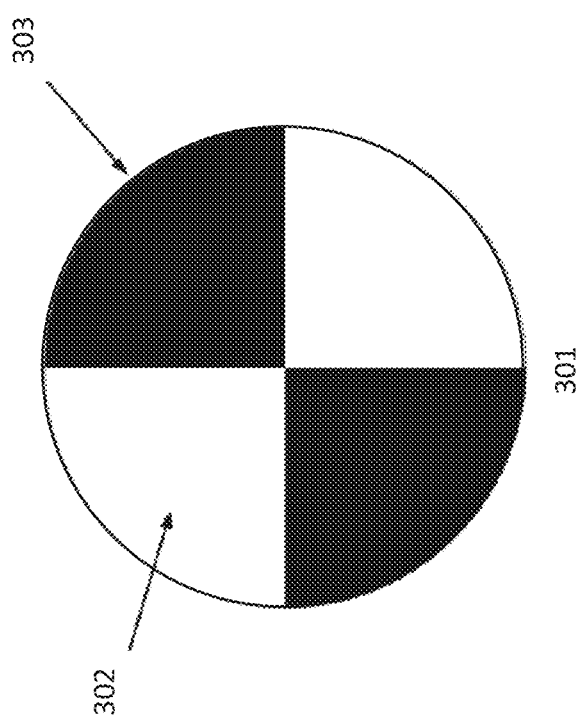

FIGS. 3A-3B illustrate two examples of suitable calibration patterns that may be used as fiducial targets, according to some embodiments. In the example of FIG. 3A, a fiducial target 301 is configured with areas of comparatively high reflectivity 302 and areas of comparatively low reflectivity 303 with respect to light emitted by a light source of an additive fabrication device. The type of pattern shown in FIG. 3A is sometimes referred to as a Secchi pattern, and may have a known radius R.

In some embodiments, a light source of an exposure system (e.g., the system 250 shown in FIG. 2C or otherwise) may be operated to scan the area of light exposure in a circle having radius R/2 and centered on the expected center of the fiducial target 301. In the case where this exposure path is fully contained within the radius of the fiducial target 201, a processor coupled to a sensor receiving scattered actinic radiation will typically detect four "edges" to the signal, corresponding to points at which the exposure path crosses from a sector with low reflectivity 303 into a sector with high reflectivity 302 and from high reflectivity 302 back into a low reflectivity 303 sector. Based upon a combination of such crossing edges and the expected radius R/2 of that path, four points or edges may be identified, with alternating edges or points forming two roughly perpendicular lines. The intersection of these lines thus provides an estimate for the center point of the fiducial target 301. Accordingly, this measured center point may be compared to the expected center point in order to determine an offset used to refine the calibration of the exposure source. Such a refinement process may be repeated until the desired accuracy of measurement is obtained.

In general, the radius of the fiducial target 301 may be most advantageously selected to be larger than the maximum expected calibration error. In some cases, however, the exposure path may be sufficiently out of calibration so as not to be contained within or intersect with the fiducial target. In such cases, an approximate location of a fiducial target may be determined by scanning a wider area in order to identify regions with increased diffuse reflectivity, and attempting to calibrate using such a region as a probable target. As one example, the exposure point of a light source (e.g., a laser) may be swept across the build region in a grid pattern of approximately 1 mm square. The changing reflectivity, or other optical properties, from the fiducial targets within the grid may be detected by the non-directional sensor and an approximate location of each fiducial target within the grid determined. This process may be able to detect the location of multiple fiducial targets at different locations in a sequence. Such an approach may be particularly useful to detecting and correcting nonlinear distortions or fitting more accurate corrective calibrations onto exposure point targeting. In some embodiments, such as those using Secchi patterns as fiducial targets, the fiducial target may have properties that allow its spatial orientation to be determined by a processor analyzing light scattered from such a target, thus allowing for an overall orientation to be determined for a component bearing such fiducial targets.

FIG. 3B depicts another illustrative calibration pattern 311, being a binary grid of contrasting regions, such as high 312 and low 313 reflectivity, similar to those used as data matrix, "QR", or barcodes. In some embodiments, such a grid may be substantially or entirely antisymmetric, such that columns and/or rows are pairwise distinct. A calibration pattern like pattern 311 may provide for increased precision and faster calibration compared with a less complex pattern like patter 301 by allowing for more information to be gathered during a scan of an exposure point across the pattern. In particular, the sequence of signals recorded by a sensor receiving light scattered from a transit of a light exposure point across the grid may depend on both the particular matrix pattern on the fiducial target and the particular path taken by the exposure point during the transit.

In some embodiments, a specific path taken by an area of light exposure over the pattern 311 may be determined by comparing information about the known pattern with an observed sequence of signals produced by a sensor receiving light scattered from the pattern. The determined path may then be compared against a path implied by the current calibration of the additive fabrication device in order to determine one or more offsets used to refine the calibration.

In some embodiments, a sequence of signals produced by a sensor may be analyzed to determine the spacing between regions of contrasting optical properties on a fiducial target. A determined spacing may be compared to the known spacing between regions of the fiducial target in order to determine additional information about the position of the fiducial target. As one example, the distance of the fiducial target from the exposure source may be determined based on the ratio between the observed and expected spacing between regions. In many cases, this distance may provide a third, or "z", dimension of position information. Moreover, nonuniform changes in the observed spacing versus the actual spacing may indicate that the fiducial target is oriented at an angle to the exposure source, such that the distance changes over the field of the fiducial target.

In some embodiments, additional information may be encoded into a fiducial target such as matrix pattern 311 that is capable of being "read" (e.g., detected and decoded) via scanning with an exposure source either during a calibration procedure or during a separate step. In particular, a sequence of rising and falling signals detected by a sensor may be analyzed and converted into a digital code by a processor coupled to the sensor. Such matrix patterns may thus function as both a calibration source and a traditional barcode.

In some embodiments, information encoded into a fiducial target, such as the matrix pattern 311, may identify a component of an additive fabrication device. For instance, such information may identify a model number of the component. In some cases, identification of a removable component, such as a container in a stereolithographic printer, may be particularly beneficial. Such identification may uniquely identify the given instance of a component so that the additive fabrication device can track usage of the removable components and determine which component has been installed.

Conventional approaches to such identification typically relies on emitters, such as RFID tags, or microchips embedded within the component capable of interfacing with the apparatus. These solutions, however, are potentially expensive and error prone. Fiducial targets bearing encoded information may more readily provide a wide range of information storage attached to a removable component at low cost, including providing a unique identifier for a particular removable component or type of component, process parameter adjustments appropriate for a particular component or type of component, and/or various other types of information that may be useful for the operation, calibration, or maintenance of an additive manufacturing system.

According to some embodiments, at least a portion of a calibration pattern may be formed from phase-change materials, such as GeSbTE (germanium-antimony-tellurium), capable of being both read and "written" to by an exposure source. In such cases, information, such as cycle counts, material usage, and other operating parameters changing over time, may be recorded and recovered from such fiducial targets.

In some embodiments, a fiducial target such as, but not limited to, calibration patterns 301 and 311 shown in FIGS. 3A and 3B, may be removably attached to a component of an additive fabrication device. This may allow the fiducial target to be installed prior to manufacturing or some other step during the lifetime of the device, then subsequently removed once a desired calibration process has been performed. As one example, one or more fiducial targets may be formed onto a layer of adhesive material, forming a calibration "sticker," and such a sticker may be placed on a desired component, such as the top surface of the bottom of a container (e.g., container 106, container 200) and/or the lower surface of a build platform. Calibration according to the steps described above may then be conducted with reference to fiducial targets present on the sticker, potentially identifying particular characteristics of said component, such as distortions or deflections, and accounting for such distortions in the calibration of the exposure source. Following the completion of desired calibration, the sticker may then be removed before normal operation of the system. Advantageously, embodiments using such as temporary attachment of fiducial targets may include fiducial targets essentially within the same area and plane of a planar build region and such fiducial targets may extend across the full build region during the calibration process, which may both account for the variances of the removable component and for any variances across the full range of the build region and any variation in the non-removable portion of the system. Following this calibration process, the fiducial targets may be detached and normal operation begun without the risk of obstruction by the fiducial targets or related material.

FIG. 4 illustrates a build platform in a stereolithographic printer having a plurality of fiducial targets disposed on its surface, according to some embodiments. For purposes of illustration, a build platform of an inverted stereolithographic printer, such as that shown in FIGS. 1A-1C, is depicted in FIG. 4, although it will be appreciated that fiducial targets may be applied to any suitable build platform in any type of additive fabrication device.

In the example of FIG. 4, a build platform 404 has fiducial targets 424 and 422 disposed on its surface. The fiducial targets 422 are preferably located at corners of the build platform so as not to inhibit the formation of solid material on most of the surface of the build platform.

In some embodiments, build platform 404 may be calibrated by lowering the platform (i.e., moving it toward the container 406) to a location at or near the plane of the build region during normal operation. Preferably, this operation is performed without solid material present on the build platform, although this is not a requirement. In this way, the build platform may provide a calibration plate-like structure, potentially providing calibration data for the full range of the build region, while avoiding the need to insert a calibration plate and without obstructing the build region during normal operation. For example, by detecting a position of fiducial target 422 via techniques of illuminating and detecting scattered light as described above, a position of the lower face of the build platform may be determined. The position of the build region may optionally then be determined based on the known position of the build platform relative to the build region. Fiducial targets 424 may also be scanned to produce such a measurement by detecting the position of these targets via techniques of illuminating and detecting scattered light as described above and calculating the position of the build region based on knowledge of the spatial relationship between the top of the build platform and the build region (which in the example of FIG. 4 would include at least the thickness of the build platform).

According to some embodiments, detecting a position of a fiducial target disposed on a build platform via techniques of illuminating and detecting scattered light as described above may enable detection and measurement of any x-y plane shift of the build platform. An x-y plane shift may occur in some cases when the build platform moves in one direction (a z-direction) and the mechanism that causes such motion can 'wobble' causing motion of the build platform in a direction perpendicular to the z-direction. By considering the known position of a light source scattering from a fiducial target disposed on the build platform, any x-y shifts in the build platform produced as it moves in the z-direction may be identified and measured based on the received light scattered from the target.

As discussed above, whilst the examples thus far have primarily featured components of a stereolithographic additive fabrication device, the techniques of calibrating by optically scanning a fiducial sensor disposed on a component of the device are applicable to other additive fabrication technologies. To illustrate one such other example, FIGS. 5A-5B describe application of these techniques in a selective laser sintering (SLS) additive fabrication device.

Figure 5A:
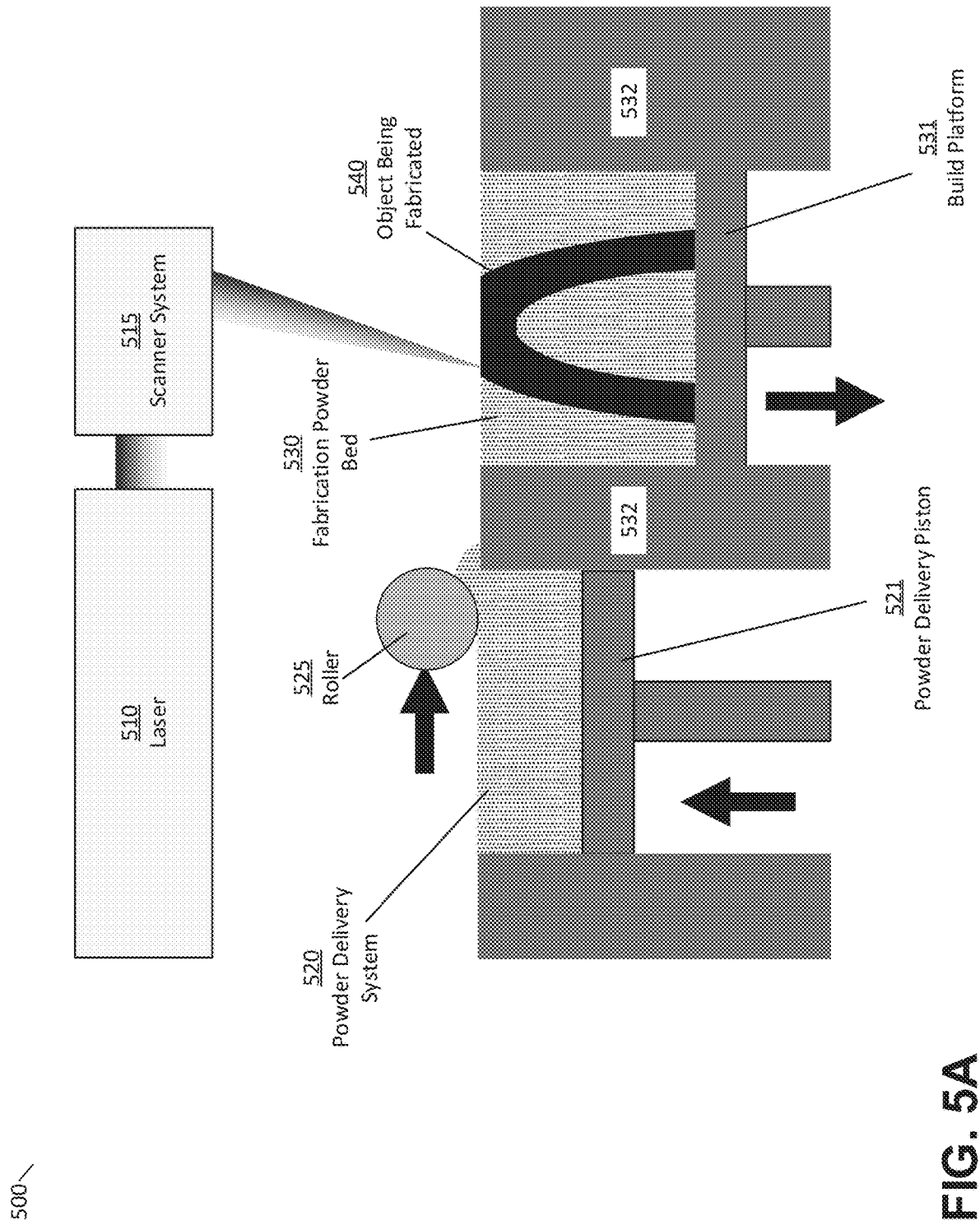
FIG. 5A depicts an illustrative selective laser sintering additive fabrication device, according to some embodiments.

In the example of FIG. 5A, SLS device 500 comprises a laser 510 paired with a computer-controlled scanner system 515 disposed to operatively aim the laser 510 at the fabrication bed 530 and move over the area corresponding to a given cross-sectional area of a computer aided design (CAD) model representing a desired part. Suitable scanning systems may include one or more mechanical gantries, linear scanning devices using polygonal mirrors, and/or galvanometer-based scanning devices.

In the example of FIG. 5A, the material in the fabrication bed 530 is selectively heated by the laser in a manner that causes the powder material particles to fuse (sometimes also referred to as "sintering" or "consolidating") such that a new layer of the object 540 is formed. SLS is suitable for use with many different powdered materials, including any of various forms of powdered nylon. In some cases, areas around the fabrication bed (e.g., the walls 532, the platform 531, etc.) may include heating elements to heat the powder in the fabrication bed. Such heaters may be used to preheat unconsolidated material, as discussed above, prior to consolidation via the laser.

Once a layer has been successfully formed, the build platform 531 may be lowered a predetermined distance by a motion system (not pictured in FIG. 5A). Once the build platform 531 has been lowered, the material deposition mechanism 525 may be moved across the fabrication bed 530, spreading a fresh layer of material across the fabrication bed 530 to be consolidated as described above. Mechanisms configured to apply a consistent layer of material onto the fabrication bed may include the use of wipers, rollers, blades, and/or other leveling mechanisms for moving material from a source of fresh material to a target location. In some embodiments, the build platform 531 may be removable from the system 500.

Since material in the powder bed 530 is typically only consolidated in certain locations by the laser, some material will generally remain within the bed in an unconsolidated state. This unconsolidated material is sometimes referred to as a "part cake." In some embodiments, the part cake may be used to physically support features such as overhangs and thin walls during the formation process, allowing for SLS systems to avoid the use of temporary mechanical support structures, such as may be used in other additive manufacturing techniques such as stereolithography. In addition, this may further allow parts with more complicated geometries, such as movable joints or other isolated features, to be printed with interlocking but unconnected components.

The above-described process of producing a fresh layer of powder and consolidating material using the laser repeats to form an object layer-by-layer until the entire object has been fabricated. Once the object has been fully fabricated, the object and the part cake may be cooled at a controlled rate so as to limit issues that may arise with fast cooling, such as warping or other distortion due to variable rate cooling. The object and part cake may be cooled while within the selective laser sintering apparatus, or removed from the apparatus after fabrication to continue cooling. Once fully cooled, the object can be separated from the part cake by a variety of methods. The unused material in the part cake may optionally be recycled for use in subsequent fabrication.

Figure 5B:
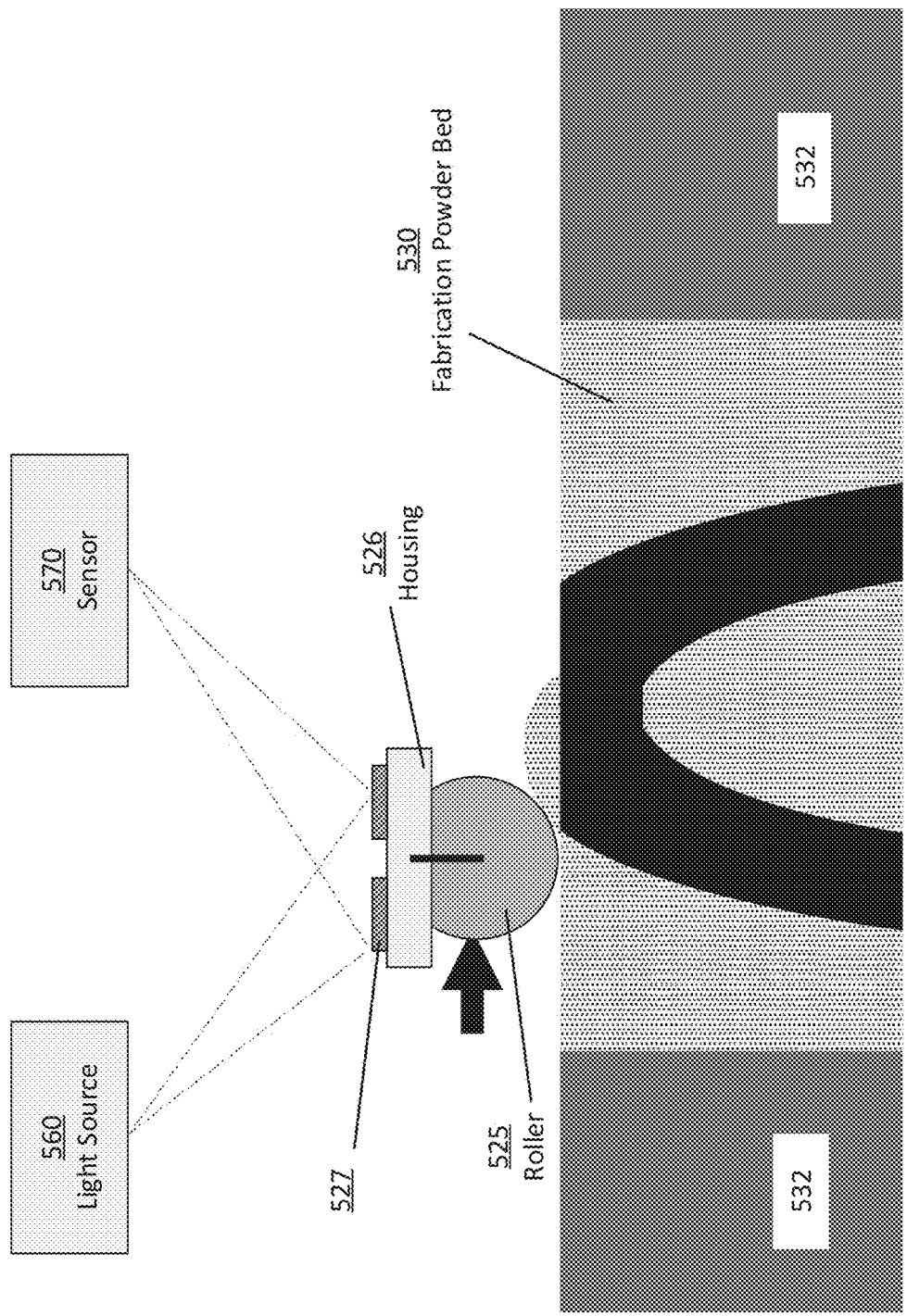
FIG. 5B illustrates a recoater within a selective laser sintering additive fabrication device having a plurality of fiducial targets disposed on its surface, according to some embodiments.

FIG. 5B illustrates a recoater within a selective laser sintering additive fabrication device having a plurality of fiducial targets disposed on its surface, according to some embodiments. In the example of FIG. 5B, which shows a portion of the additive fabrication device shown in FIG. 5A, fiducial targets 527 are disposed onto a structure 526 that is mechanically coupled to the roller 525 (the structure 526 was omitted in FIG. 5A for clarity). The light source 560 is configured to illuminate the fiducial targets 527 as the roller is moved across the surface of the powder bed, as described above. The light scattered therefrom and detected by sensor 570 may provide positional information on the fiducial targets 527. In some embodiments, such positional information may identify the distance from the light source to the fiducial targets 527, which in turn may provide for a determination of the height of the powder bed based on a known fixed distance between the top of the roller unit, where the fiducial sensors 527 are positioned, and the bottom of the roller, which contacts the surface of the powder bed.

Figure 6:
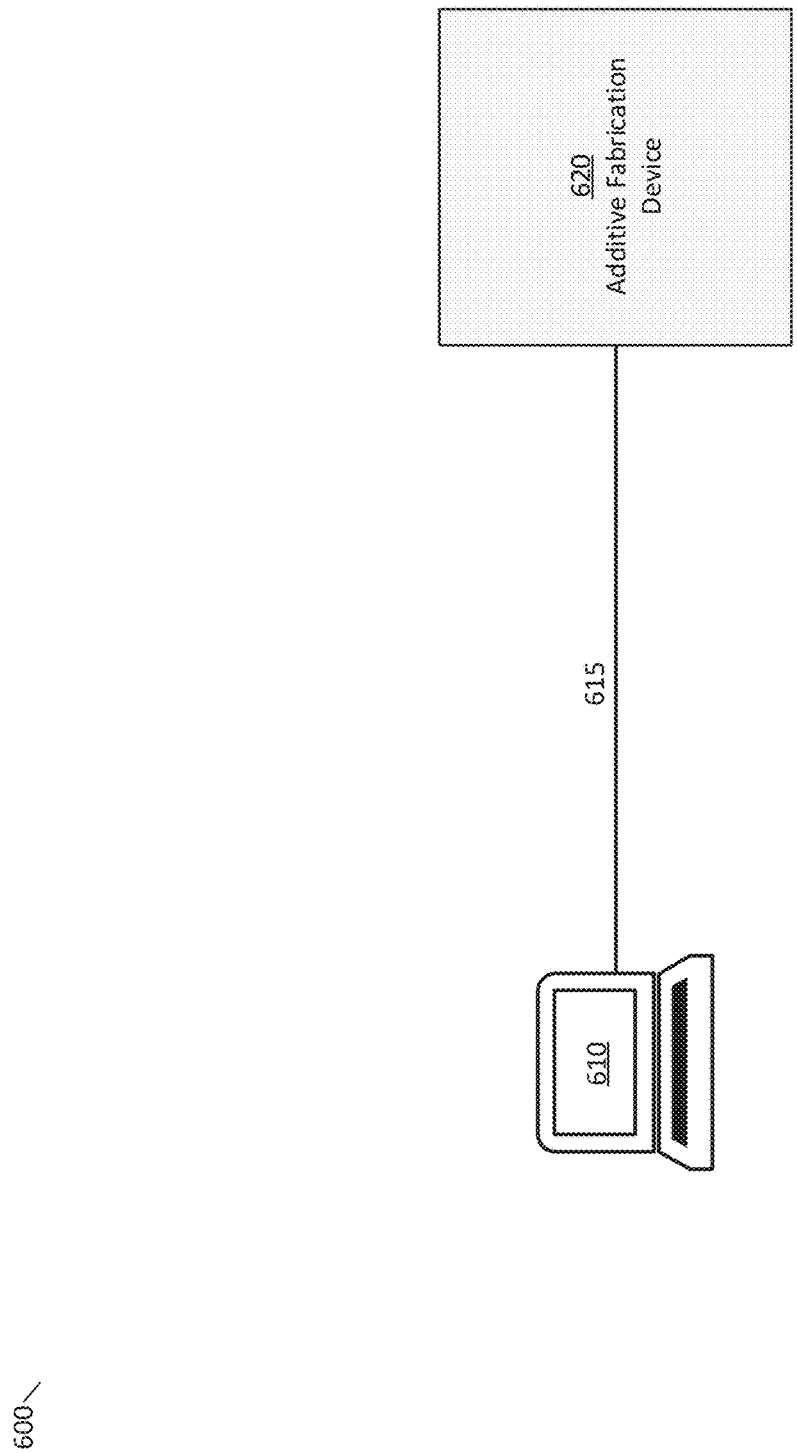
FIG. 6 is a block diagram of a system suitable for practicing aspects of the invention, according to some embodiments.

FIG. 6 is a block diagram of a system suitable for practicing aspects of the invention, according to some embodiments. System 600 illustrates a system suitable for generating instructions to control an additive fabrication device to perform calibration operations as described above in addition operation of the additive fabrication device to fabricate an object. For instance, instructions to operate one or more light sources, light directing components associated with such light sources (e.g., computer adjustable mirrors, such as mirror galvonometers), sensors, and/or one or more processors of the additive fabrication device may be generated. In some cases, the instructions may also, when executed by the additive fabrication device, cause the additive fabrication device to perform calibration operations discussed above, including to produce light, measure scattered light at a sensor, and calculate a position of a fiducial target based on the measured scattered light.

According to some embodiments, computer system 610 may execute software that generates two-dimensional layers that may each comprise sections of the object. Instructions may then be generated from this layer data to be provided to an additive fabrication device, such as additive fabrication device 620, that, when executed by the device, fabricates the layers and thereby fabricates the object. Such instructions may be communicated via link 615, which may comprise any suitable wired and/or wireless communications connection. In some embodiments, a single housing holds the computing device 610 and additive fabrication device 620 such that the link 615 is an internal link connecting two modules within the housing of system 600.

Although the preceding examples have described fiducial targets with varying or contrasting degrees of diffuse reflectivity, fiducial targets may alternatively, or additionally, exhibit other types of optical properties in order to provide fiducial targets capable of producing emissions for indirect sensing. As one example, fiducial sensors may comprise fluorescent or phosphorescent material such that energy absorbed from the exposure source with a given frequency may be reemitted at a different fluorescent frequency which may then be detected by a sensor. As one example, typical office paper may be treated with various whiteners or other compounds fluorescing strongly at 405 nm. Other compounds, such as fluorescein or 4,4'-Diamino-2,2'-stilbene-disulfonic acid may also be used. In such embodiments, the sensor may be masked or otherwise prevented from detecting energy other than at the frequency of the fluorescent emission, such as via a notch filter. In some instances, a reverse-stokes-shift target material may be desirable for the forming of fiducial targets when the light source is, for example, an infrared laser. In some instances, a fiducial target may comprise phosphors that re-emit energy from the exposure source when illuminated by, for example, an electron beam.

In some embodiments, exposure to radiation may cause regions of a fiducial target to heat at differential rates, thus emitting energy in infrared frequencies that may be indirectly measured. Alternatively, non-diffuse reflectivity may be utilized in order to scatter or deflect energy towards non-directional sensors expected to fall within the path of such scattered or deflected energy. In some embodiments, this may take the form of regions of retroreflectivity, capable of returning at least a portion of the energy incident onto the fiducial target region towards the exposure source. In such embodiments, indirect sensing means may be configured within or proximate to the optical path of the exposure source, such that sensors may measure the amount of energy returned via retroreflection from the fiducial target.

Furthermore, although the preceding examples have described calibration primarily in terms of single exposure points in an additive fabrication device, such as may be generated using a laser and galvanometer system or electron beam, embodiments of the present invention may be utilized for a wide variety of systems and types of exposure mechanisms. As one example, systems utilizing mask-type exposure systems, such as DLP, projector or LCD-masked light sources, may be calibrated using the above approach by activating one or more "pixels" or elements in the mask, thus causing an effective exposure point to form within the build region. Similarly, although the preceding examples have described non-directional sensors in terms of single point sensors, such as a photodiode, other forms of indirect sensing may be utilized. As an example, a sensing device with multiple points of resolution, such as a digital camera sensor, may be used to provide indirect sensing. Such a configuration may allow for the more rapid location of misaligned fiducial targets by providing additional visual information for aligning the exposure point with a fiducial target. In addition, such sensing devices may allow for the detection of exposure of multiple points of exposure, such as may be formed using a mask-type exposure system. Alternatively, or in addition, the calibration techniques used in embodiments of the present invention may be particularly useful in providing for the calibration of systems using more than one exposure source, potentially with fields of exposure which may only partially, or may not, overlap within the field of the build region.

In addition to the detection of preplaced fiducial targets, in some embodiments characteristics of a variety of operations within a build region or larger build environment may be detected and measured. As one example, many materials undergo changes in color and/or reflectivity during a consolidation or curing. In an illustrative embodiment involving the sintering of plastic powder, consolidated plastic powder may tend to scatter less energy than unconsolidated powder. In an illustrative embodiment involving the deposition of binder or sintering inhibition material onto a powder material, the introduction of the second material, typically a liquid, may also change the reflectivity of the combined material at various frequencies. Accordingly, the exposure source of the sintering device or, as described above, an alternative exposure source, may be scanned across portions of the build region to determine sintered regions so as to adjust calibrations, detect failures, or otherwise make process decisions. In general, the use of an non-directional sensor combined with a controlled energy source allows embodiments of the present inventions to infer various types of optical properties across a two dimensional plane or within a three-dimensional volume by varying the target of the controlled energy source in a time-dependent series, even when the only point of measurement is a fixed point source of measurements.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An additive fabrication device configured to fabricate an object by directing energy onto one or more source materials that include a powdered material, the additive fabrication device comprising:
   a fabrication bed configured to hold the one or more source materials;
   at least one light source;
   at least one sensor;
   a structure configured to move over and contact a surface of the one or more source materials in the fabrication bed during said fabrication of the object, wherein a surface of the structure includes a calibration pattern; and
   at least one processor configured to:
      direct the at least one light source to the calibration pattern of the structure;
      measure, via the at least one sensor, an intensity of light scattered from the calibration pattern of the structure; and
      determine a position of the structure relative to the surface of the one or more source materials in the fabrication bed based at least in part on the measured intensity of light.

2. The additive fabrication device of claim 1, wherein the at least one processor is further configured to move the structure over the surface of the one or more source materials in the fabrication bed during fabrication of the object.

3. The additive fabrication device of claim 1, further comprising a material deposition mechanism configured to deposit the one or more source materials over the fabrication bed.

4. The additive fabrication device of claim 3, wherein the structure is mechanically coupled to the material deposition mechanism.

5. The additive fabrication device of claim 1, wherein the calibration pattern includes a plurality of surface features having at least two different surface reflectivities.

6. The additive fabrication device of claim 1, further comprising at least one computer readable medium, and wherein the at least one processor is further configured to store a plurality of calibration values in the at least one computer readable medium based on the determined position of the structure.

7. The additive fabrication device of claim 6, wherein the plurality of calibration values include a lookup table.

8. The additive fabrication device of claim 1, wherein the at least one light source is configured to produce light at at least one non-visible wavelength.

9. The additive fabrication device of claim 1, wherein the at least one processor is configured to:
- direct the at least one light source over a plurality of locations on the calibration pattern;
- measure, via the at least one sensor, the intensity of light scattered from the calibration pattern for each of the plurality of locations, thereby producing a plurality of measurements; and
- determine the position of the container relative to the surface of the one or more source materials in the fabrication bed based at least in part on the plurality of measurements.

10. The additive fabrication device of claim 1, wherein the structure comprises a roller configured to spread the one or more source materials over a build platform.

11. A method of calibrating an additive fabrication device configured to fabricate an object by directing energy onto one or more source materials within a fabrication bed, the one or more source materials including a powdered material, the method comprising:
- directing at least one light source of the additive fabrication device onto a calibration pattern, wherein the additive fabrication device comprises a structure configured to move over and contact a surface of the one or more source materials in the fabrication bed during said fabrication of the object and to move relative to the one or more source materials during said fabrication of the object, and wherein the calibration pattern is disposed on a surface of the structure;
- measuring, via at least one sensor of the additive fabrication device, an intensity of light scattered from the calibration pattern of the structure and originating from the at least one light source; and
- determining a position of the structure relative to the surface of the one or more source materials in the fabrication bed based at least in part on the measured intensity of light.

12. The method of claim 11, wherein the additive fabrication device further comprises a mounting attachment, and wherein the structure is configured to be removably attached to and detached from the mounting attachment.

13. The method of claim 11, further comprising depositing, with a material deposition mechanism mechanically coupled to the structure, the one or more source materials over the fabrication bed.

14. The method of claim 11, wherein the calibration pattern includes a plurality of surface features having at least two different surface reflectivities.

15. The method of claim 11, further comprising storing a plurality of calibration values in at least one computer readable medium based at least in part on the determined position of the structure.

16. The method of claim 11, comprising:
- directing the at least one light source over a plurality of locations on the calibration pattern;
- measuring, via the at least one sensor, the intensity of light scattered from the calibration pattern for each of the plurality of locations, thereby producing a plurality of measurements; and
- determining the position of the container relative to the surface of the one or more source materials in the fabrication bed based at least in part on the plurality of measurements.

\* \* \* \* \*